United States Patent

Wagner

[15] 3,650,806
[45] Mar. 21, 1972

[54] PROCESS FOR TREATING WOOL

[72] Inventor: George M. Wagner, Lewiston, N.Y.

[73] Assignee: Hooker Chemical Corporation, Niagara Falls, N.Y.

[22] Filed: Feb. 16, 1970

[21] Appl. No.: 11,900

Related U.S. Application Data

[63] Continuation-in-part of Ser. No. 622,465, Mar. 13, 1967, abandoned.

[52] U.S. Cl..............................117/62.2, 8/127.6, 117/141, 117/161 KP
[51] Int. Cl....................................B44d 1/44, D06m 15/52
[58] Field of Search................117/141, 161 KP, 62.2; 8/128, 8/127.6

[56] References Cited

UNITED STATES PATENTS

| | | | |
|---|---|---|---|
| 3,093,441 | 6/1963 | Whitfield et al. | 117/141 X |
| 3,384,506 | 5/1968 | Elkin | 117/141 X |
| 3,386,962 | 6/1968 | Damusis | 117/161 X |

FOREIGN PATENTS OR APPLICATIONS

| | | | |
|---|---|---|---|
| 232,542 | 4/1958 | Australia | 117/161 |
| 908,188 | 4/1960 | Great Britain | 117/161 |

*Primary Examiner*—William D. Martin
*Assistant Examiner*—Harry J. Gwinnell
*Attorney*—Peter F. Casella, Donald C. Studley, Richard P. Mueller and James F. Mudd

[57] ABSTRACT

A process for treating wool and other proteinaceous material to render it shrinkproof which comprises treating the proteinaceous material with a polymerizable treating solution which contains the reaction product of a diol and a polyisocyanate or a urethane-polyisocyanate, and, thereafter, curing the thus-treated material with water. The reaction product produced contains at least three free NCO groups per molecule. Preferably, the polyisocyanate or urethane-polyisocyanate used contains three isocyanate groups. These isocyanates may be of the polymethylene polyphenyl type, as well as of the type formed by reacting a polyhydroxy compound containing from three to six OH groups with a diisocyanate and, additionally, may also contain from about 0.05 to 3 percent by weight of tertiary nitrogen. The solutions used to treat the proteinaceous material typically contain from about 0.5 to 50 percent by weight of the above compositions. The proteinaceous materials treated with these compositions are found to have an improved hand over those materials which are treated with similar solutions but which contain polyisocyanates or urethane polyisocyanates which have not been reacted with a diol.

15 Claims, No Drawings

PROCESS FOR TREATING WOOL

This is a continuation-in-part of my copending application, Ser. No. 622,465, filed Mar. 13, 1967, now abandoned.

This invention relates to an improved process for treating wool and more particularly, it relates to an improved process for treating wool and similar proteinaceous materials so as to render them substantially shrinkproof.

Heretofore, considerable effort has been put forth in the development of compositions and processes for treating wool and similar proteinaceous materials so as to render them resistant to shrinking in washing. For the most part, these processes have not met with appreciable commercial acceptance because they are expensive or difficult to apply, or do not have sufficient durability, or they adversely affect the hand or feel of the fabric.

Recently, however, it has been proposed to treat wool or similar proteinaceous materials with polymerizable solutions of polyisocyanate or urethane polyisocyanate material. In a copending application, Ser. No. 510,028, filed Nov. 26, 1965, now U.S. Pat. No. 3,552,910, it is taught that wool and similar proteinaceous materials may be rendered shrink resistant by treatment with a polymerizable solution containing a polyisocyanate of the polymethylene polyphenyl type. In a copending application, Ser. No. 814,846, filed Apr. 9, 1969, now abandoned, it is taught that wool and similar proteinaceous materials may be rendered shrink resistant by treatment with a polymerizable solution containing a polyhydroxy modified isocyanate, such as a urethane polyisocyanate prepared by the reaction of a polyhydroxy compound and a diisocyanate. In a third copending application, Ser. No. 619,066, filed Feb. 27, 1967, now abandoned, it is taught that polyisocyanates and urethane-polyisocyanates, as set forth in the two preceding copending applications, which contain at least 0.05 percent by weight of tertiary nitrogen, may be used in treating wool and similar proteinaceous materials to render them substantially shrinkproof. Although the use of these compositions in the process as set forth in these three copending applications has overcome the difficulties of the prior art processes and generally produce durably shrinkproof wool products, having a good hand, in some instances, it has been found desirable if the treated proteinaceous material have a softer and less full hand or feel than that which is normally produced by these processes.

It is, therefore, an object of the present invention to provide an improved process for treating wool and other proteinaceous materials to render them substantially shrinkproof.

A further object of the present invention is to provide an improvement in the process which utilizes polyisocyanates and urethane polyisocyanate compositions in treating wool and other proteinaceous materials to render them shrinkproof, whereby an improved hand or feel of the treated fabric is obtained.

These and other objects will become apparent to those skilled in the art from the description of the invention which follows:

Pursuant to the above objects, the present invention includes a process for treating a proteinaceous material to render it shrinkproof which comprises contacting the proteinaceous material with a polymerizable treating solution containing the reaction product of a diol and an isocyanate material selected from polyisocyanates and urethane-polyisocyanates, which reaction product contains at least 3 free NCO groups per molecule and, thereafter, curing the thus-treated proteinaceous material with water. The treated proteinaceous materials produced by this method are found to have a softer and less full hand than similarly treated proteinaceous material but wherein the treating solution contains polyisocyanate or urethane polyisocyanates which have not been further reacted with a diol.

More specifically, in the practice of the present invention, the proteinaceous materials to be treated are proteinaceous textile materials, and particularly proteinaceous textile which undergo shrinking during normal laundering operations. These textile materials may be in various forms, including yard goods, as well as various finished articles, such as articles of clothing, including coats, sweaters, socks, shirts, trousers, skirts, and the like. Of the numerous proteinaceous materials of which such articles may be made, the process of the present invention has been found to be particularly applicable in treatment of wool. Accordingly, hereinafter, primary reference will be made to wool as being the preferred proteinaceous material. This is not, however, to be taken as a limitation of the present invention as other proteinaceous materials which are subject to shrinkage may also be advantageously treated by the present process, including fabrics made of alpaca, angora, camel hair, cashmere, huarizo, lama, misti, mohair, suri, vicouna and the like. Additionally, the process of the present invention is not limited to the treatment of wool or other proteinaceous materials in the form of yard goods or finished articles, but may, in some instances, also be utilized in treating these materials in the fiber or yarn form.

It is to be further appreciated that the proteinaceous materials treated may be admixed with other non-proteinaceous materials as in various fiber blends with synthetics or other natural fiber materials or they may be in the form of a so-called "multi-ply" fabric wherein the proteinaceous fabric is bonded to a fabric of some other material, such as acetate, rayon, nylon, and the like. The treatment of this latter type material has been found to be particularly advantageous in that such materials when treated are found to be substantially wrinkle-free after washing, thereby providing a "wash and wear" wool.

In treating the above-described proteinaceous materials in accordance with the method of the present invention, these materials are desirably impregnated with a polymerizable treating solution containing the reaction product of a diol and an isocyanate material selected from the group consisting of polyisocyanates and urethane-polyisocyanates. The isocyanate materials used may be of the polymethylene polyphenyl type, or they may be urethane polyisocyanates, such as those prepared by the reaction of a polyhydroxy compound, and a diisocyanate. Additionally, the isocyanate material used may also contain tertiary nitrogen, in an amount of at least 0.05 percent by weight.

In general, the polyisocyanates are polyaryl polyisocyanates containing at least three aryl groups and an average of at least three isocyanate groups, a portion of which isocyanate groups may be modified by reaction with an alcohol, a thioalcohol, an organic acid, an amine, or an amide. For a more specific description of polyisocyanates of this type, reference is made to a copending application, Ser. No. 510,028, filed Nov. 26, 1965, which application is hereby incorporated into the present disclosure.

In general, the urethane type of polyisocyanates are polyhydroxy modified isocyanates containing at least three free NCO groups per molecule. For a more specific description of these urethane-polyisocyanates, reference is made to copending application, Ser. No. 814,846, filed Apr. 9, 1969, which application is hereby incorporated in the present disclosure.

In general, the tertiary nitrogen containing isocyanate materials are urethane-polyisocyanate which contain $(OH)_n$, $(NCO)_p$ and

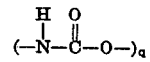

groups wherein $n$ is a number from 0 to 4.5, $p$ is a number from 1.5 to 6, $q$ is a number from 1 to 20 and $n+p$ is a number from 3 to 6, which compositions contain at least 0.05 percent of tertiary nitrogen. These compositions may be prepared by reacting a polyhydroxy compound containing from 3 to 6 hydroxyl groups with a diisocyanate, wherein from 1 to 100 percent of the polyhydroxy compound is a tertiary nitrogenous polyol, or by reacting a tertiary nitrogenous hydroxy compound containing from one to six OH groups with a polyisocyanate or urethane-polyisocyanate containing from two to six isocyanate groups. For a specific description of compounds of this type, reference is made to copending application, Ser. No. 619,066 filed Feb. 27, 1967, which application is hereby incorporated in the present disclosure.

In the preferred embodiment of the present process, the polyisocyanate or urethane-polyisocyanate used contains three isocyanate groups and is reacted with a diol in an amount such that the resulting product contains less than about 50 mole percent of the diol, and preferably from about 15 to 35 mole percent of the diol. Exemplary of the diol which may be reacted are dihydroxyalkanes, containing from about two to 12 carbon atoms; alkylene diols, containing from about two to 12 carbon atoms; polyester diols having an average molecular weight of about 200 to 10,000 polyurethane diols having an average molecular weight of about 200 to 10,000 and polyether diols having an average molecular weight of about 62 to 10,000. Specific examples of typical diols falling within the above groups which may be used are the following:
Hydroxy Terminated Polyethylene glycol adipate ester having an average molecular weight of 762;
Hydroxy Terminated Polyethylene glycol adipate ester having an average molecular weight of 5,500;
Butane diol;
Polypropylene glycol having an average molecular weight of 5,000;
Polypropylene glycol having an average molecular weight of 1,000;
Hydroxy terminated polyurethane from the reaction of 6 moles toluene diisocyanate and 7 moles ethylene glycol; and
Polyethylene glycol having an average molecular weight of 1,000.

In carrying out the indicated reaction, the polyisocyanate or urethane polyisocyanate, preferably containing three isocyanate groups, as has been described hereinabove, is dispersed or dissolved in a suitable solvent. Although any solvent, in which the isocyanate material will dissolve without decomposition may be used, in many instances, the aromatic organic solvents, such as benzene, toluene, xylene and the like are preferred. Additionally, halogenated aliphatic solvents such as trichloroethylene, perchloroethylene, carbon tetrachloride, and methylene chloride, and the like have also been found to be extremely useful. The solvents may be classified generally as benzene, substituted benzenes containing one to three lower alkyl groups with one to six carbon atoms each and halogenated lower alkyls containing one to six carbon atoms and one to eight halogen. To the solution of the isocyanate material in the solvent, is added the desired diol, in an amount sufficient to produce a reaction product containing less than about 50 mole percent of the diol, and, preferably, containing from about 15 to 35 mole percent of the diol. Thereafter, the resulting mixture may be heated, temperatures within the range of about 25° to 60° centigrade being typical, for a period of from about 72 hours to ½ hour, to effect the desired reaction of the diol and the isocyanate material.

Once the desired reaction product is formed, additional solvent may be added to the reaction mixture to obtain an impregnating solution having the desired concentration. Typically, the impregnating solutions used will contain the reaction product in amounts within the range of about 0.5 to about 50 percent by weight of the solvent composition. In many instances, however, higher concentrations are also suitable, up to the maximum solubility of the diol-isocyanate product in the solvent used. Typical of such higher concentrations which may be used are those of 80 to 90 percent by weight of the solvent composition, or even higher, in those instances where the diol-isocyanate material used is miscible in substantially all proportions with the solvent. Alternatively, of course, the diol-isocyanate reaction product may be prepared separately and thereafter dissolved in the solvent in appropriate amounts to form the impregnating solution.

It will, of course, be appreciated that both the amount of the reactants to be used as well as the selection of the specific reactants themselves will be such that the resulting reaction product of diol and the isocyanate material contains at least three free NCO groups per molecule. Further, compounds other than those which have been specifically set forth hereinabove may be utilized in the shrinkproofing process of the present invention. In this regard, it is only necessary that the compounds which are used contain the specific amount of

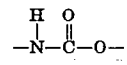

groups regardless of the method by which the compounds have been prepared. Additionally, the shrinkproofing compositions used may be a mixture of one or more of these compounds, or other similar compounds which contain the requisite number of the groups specified. Often, such mixtures will be the natural result of the preparation of the compositions, which preparation may give a statistical distribution of the possible products.

The proteinaceous material, such as a wool textile material, may be impregnated with the polymerizable shrinkproofing solution prepared as indicated hereinabove, using any convenient means. For example the wool may be immersed or padded in the treating solution and the fabric then passed through squeeze rolls to remove excess solution. If desired, the treating solution may be applied to the material by spraying, rather than by immersion. Other suitable application techniques, as are known to those in the art, may also be used. After the proteinaceous materials have been impregnated with the solution, they are preferably dried so as to remove the solvent from the material. Desirably, the impregnation is carried out so that the treated proteinaceous material has a resin add-on within the range of about one to about 15 percent by weight of the material. Higher resin add-ons than 15 percent, e.g., 40 to 50 percent, may be attained in some instances although, generally, it has not been found that such higher add-ons appreciably improve the shrink resistance which is obtained. Generally, it has been found that resin add-ons appreciably less than 15 percent, e.g., 0.1 to 5 percent are often sufficient to provide durable shrinkproofing of the proteinaceous materials. Typically, the treating solution is maintained at a temperature within the range of about 10° centigrade to the boiling point of the solvent used, e.g., 120° centigrade for perchloroethylene, and preferably is within the range of about 20° centigrade to about 30° centigrade during the impregnation step. Thereafter, the impregnated material is dried, preferably in an oven, at a temperature within the range of about 20° centigrade to the boiling point of the solvent used, with temperatures within the range of about 65° centigrade to about 125° centigrade being preferred.

Following the impregnation and drying of the proteinaceous material, the thus-treated fabric is then cured with water. Although various techniques may be utilized in effecting this water cure, the treated proteinaceous material is preferably partially cured in air, by means of the normal moisture in the atmosphere and any moisture remaining in the fabric, and is then immersed in water and maintained in the water until the curing is complete.

It has been found that the time to effect the desired cure of the diol-isocyanate material with which the proteinaceous textile is impregnated varies with the temperature at which the cure is effected. Accordingly, it is desirable that the liquid water used is at an elevated temperature, temperatures within the range of about 30° centigrade to about 100° centigrade being typical, with temperatures within the range of about 40° centigrade to about 94° centigrade being preferred. When carrying out the water cure at these temperatures, curing times within the range of about 1 hour to about 1 minute are typical, with times of 30 minutes to 2 minutes being preferred. It is to be appreciated, that where the length of curing time is not an important factor, the water cure of the diol-isocyanate impregnant may be carried out at room temperature, i.e., about 20° centigrade. Under such conditions, the curing time may be as long as several days, e.g., 48 hours. There is, however, some indication that the full shrinkproofing effectiveness of the diol-isocyanate compositions may not be attained when the water cure is carried out under these low temperature conditions. Moreover, it has been found that low temperature curing techniques, and particularly those carried out below about 40° centigrade, may not impart to the treated fabric the desired degree of durability to dry cleaning solvents, such as trichloroethylene. In many instances, after curing under these conditions, dry cleaning of the fabric may remove appreciable quantities of the cured shrinkproofing material so that after a subsequent laundering, shrinkage may occur.

In the most preferred embodiment of the present process, the liquid water cure of the treated material is preceded by a preliminary cure or setting of the impregnant in air, i.e., in the presence only of atmospheric moisture and that which may be retained in the fabric. This procedure is desirably effected at room temperatures, i.e., about 20° centigrade, although higher and lower temperatures, as indicated above, may also be used. The length of time for this air cure is generally several hours, e.g., overnight, but is normally carried out to the extent that subsequent wrinkling during the liquid water cure, will not result in permanent setting of the wrinkles in the fabric.

It is to be further appreciated, that if desired, the water cure of the diol-isocyanate impregnant may be effected by substantially saturating the impregnated proteinaceous material with water and thereafter, completing the polymerization or cure of the diol-isocyanate by heating the water-wet, substantially saturated material at an elevated temperature. In such processes, curing temperatures within the range of about 40° centigrade to about 177° centigrade for periods of about 30 minutes to about 1 minute are typical, with temperatures within the range of about 107° centigrade to about 135° centigrade for periods of 10 minutes to about 3 minutes being preferred. After the water cure of the impregnated textile material has been completed, the material is then dried to remove any water which may remain. Frequently, where the latter described curing process is used, i.e., water impregnation of the treated fabric, followed by heating at an elevated temperature, the curing and drying of the fabric is effected substantially simultaneously.

It has been found that in some instances the water used to carry out the polymerization or cure of the diol-isocyanate impregnant in the textile material is desirably slightly alkaline. Typical pH values for the curing water are within the range of about 7.5 to 9. Where the pH of the curing water is below these values, it may be adjusted by adding thereto an alkaline material, such as an alkali metal bicarbonate. Additionally, if desired, the curing water may also contain small amounts of a suitable wetting agent, to insure more thorough and rapid wetting of the impregnated material. Typical wetting agents which may be used are nonionics, such as the polyalkylene ethers and anionics, such as alkyl aryl sulfonates and sulfates. These materials are typically present in amounts within the range up to about one percent by weight of the treating water, amounts within the range of about 0.05 to about 0.2 percent being preferred. Additionally, it is to be appreciated that the final liquid water cure of the impregnated fabric may be, at least partially, effected during a subsequent fabric treating process which uses a water containing treating solution, as for example, in a dyeing process.

As has been indicated hereinabove, the process of the present invention may be carried out on proteinaceous materials in various forms, including yard goods, finished articles, such as sweaters and the like, as well as, in come cases, on the unspun fiber or the yarn itself. It has been found that proteinaceous textile materials, such as wool, which have been treated in accordance with this process consistently show an area shrinkage of less than about five percent, with area shrinkages within the range of about one to three percent being typical. Moreover, it has been found that the shrink resistance is retained by the treated fabric even after numerous washings in hot water and that the hand and feel of the treated materials are not substantially different from those of untreated material. Additionally, the shrinkproof finish is durable to dry cleaning and is found to impart dimensional stability to the fabric. It also facilitates dyeing and improves dye fastness.

In order that those skilled in the art may better understand the present invention and the manner in which it may be practiced, the following specific examples are given. It is to be understood that these examples are illustrative of the invention and are not intended to be limitations thereon. In these examples, unless otherwise indicated, temperatures are in degrees centigrade, parts and percentages are by weight and shrinkages are given as percent change from an untreated, unwashed control.

EXAMPLE 1

A polyurethane containing three isocyanate groups was prepared from 1 mole of castor oil and 3 moles of toluene diisocyanate as described in copending application, Ser. No. 814,846. To 38 grams (0.025 mole) of this product in 48 grams of trichloroethylene was added 10 grams (0.0125 mole) of polyethylene glycol adipate, having an average molecular weight of 830. This mixture was then reacted for 1 hour at 60° centigrade and there was obtained a triisocyanate ester containing 50 mole percent of the diol.

EXAMPLE 2

The procedure of Example 1 was repeated with the exception that only 7.0 grams (0.0085) mole of the diol were used. The product thus-produced was a triisocyanate ester containing 35 mole percent of the diol.

EXAMPLE 3

The procedure of Example 1 was repeated with the exception that only 5.1 grams (0.0061 mole) of the diol were used. The resulting triisocyanate ester produced contained 25 mole percent of the diol.

EXAMPLE 4

The procedure of Example 1 was repeated with the exception that only 3.2 grams (0.0038 mole) of the diol were used. The resulting triisocyanate ester product contained 15 mole percent of the diol.

EXAMPLE 5

To each of the reaction products of the preceding Examples 1 through 4 was added sufficient trichloroethylene to provide a pad bath containing the diol-isocyanate reaction product in an amount of about 2.0 percent by weight. Additionally, a similar pad bath was formed using the castor oil-toluene diisocyanate product, as in Example 1, but which had not been further reacted with a diol. Samples of wool flannel were then padded through each of the above solutions at a wet pickup of about 180 percent based on the dry weight of the wool. The thus-treated samples were then dried for 2 minutes at 120° centigrade. Each of the samples were then cured in water for 15 minutes at a temperature of 80° centigrade and the samples were then washed in a detergent solution in a center post agitator washing machine at a temperature of 60° centigrade for 5 consecutive hours. The area shrinkage of each of these samples was then determined as well as the stiffness, using a Gurley Stiffness Tester, and the following results were obtained;

| Sample | Stiffness in milligrams | Area Shrinkage in % |
|---|---|---|
| Product of Ex. 1 | 21 | 9.3 |
| Product of Ex. 2 | 21 | 0.66 |
| Product of Ex. 3 | 23 | 0.33 |
| Product of Ex. 4 | 24 | 0.66 |

| | | |
|---|---|---|
| Castor oil, TDI product | 27 | 0.66 |

It is to be noted that an untreated sample had a stiffness of 18 milligrams.

EXAMPLE 6

The procedure of Example 1 was repeated with the exception that there was added 12.5 grams of polyethylene glycol having an average molecular weight of 1,000 (0.0125 mole) in 12.5 grams trichloroethylene to the urethane-polyisocyanate, trichloroethylene solution and reacted as in Example 1. A padding solution was prepared and the fabric dried and cured as described in Example 5. The fabric, before washing had a stiffness of 20.8 milligrams (vs 27 mg. for the unmodified urethane-isocyanate resin) and evidenced only 0.66 percent area shrinkage after the accelerated 5 hour wash test.

EXAMPLE 7

A urethane-polyisocyanate was prepared as in Example 1. To 75 grams (0.05 mole) of this product was added 80 grams (0.025 moles) of a hydroxy terminated polyester from ethylene glycol and adipic acid having an average molecular weight of 3200, in 80 grams of trichloroethylene. The reactants were treated as in Example 1. The thus-formed resin was diluted to 2.0 percent solids and applied to fabric and cured as described in Example 5. The resulting woolen fabric had a stiffness value of only 1.88 and a felting area shrinkage of only 1.06 percent after the 5 hour accelerated wash test.

EXAMPLE 8

A urethane-polyisocyanate was prepared as in Example 1. To 75 grams (0.50 mole) of this product was added 13.4 grams (0.033 mole) of polyethylene glycol having an average molecular weight of 400, in 13.4 grams trichloroethylene. The reactants were treated as in Example 1. The resin was diluted to 2 percent solids and applied to fabric and cured as described in Example 5. The resulting woolen fabric had a stiffness of 19.4 and evidenced only 0.66 percent area shrinkage after the accelerated wash.

EXAMPLE 9

A urethane-polyisocyanate was prepared as in Example 1. To 75 grams (0.05 mole) of this product was added 2.25 grams (0.025 moles) of butanediol in 2.25 grams of trichloroethylene. The mixture was reacted as in Example 1. The resin was diluted to 2 percent solids and applied to fabric and dried and cured as described in Example 5. The treated fabric had a stiffness of 24 milligrams and evidenced an area shrinkage of only 1.86 percent after the 5 hour accelerated wash test at 60° centigrade.

EXAMPLE 10

The following two solutions of a diol and a diisocyanate were prepared, having a total active solids content of 4.5 percent and a diol:diisocyanate mole ratio of 1:1:

| Solution A | % by weight |
|---|---|
| Bisphenol A | 2.55 |
| toluene diisocyanate | 1.95 |
| methyl ethyl ketone | 12.32 |
| trichloroethylene | 83.18 |
| Solution B | |
| Polyethylene glycol (Avc. M.W. - 6000) | 4.37 |
| toluene diisocyanate | 0.14 |
| methyl ethyl ketone | 8.00 |
| tetrahydrofuran | 8.00 |
| trichloroethylene | 79.49 |

A 12 × 16 inch swatch of 6 oz. all woolen fabric was immersed in the treating solution, squeezed, and dried for 15 minutes at room temperature, and then "water cured". The water cure consisted of immersing in water containing 0.1 percent Tritan X–100 at 80° Fahrenheit and raising to 120° Fahrenheit over a 20 minute period. The cured swatch was dried, equilibrated to laboratory conditions, weighed to determine add-on, and then tested. The shrinkage test consisted of repeated washes in a center post automatic washer using a commercial detergent and a water temperature about 100° Fahrenheit. Using this procedure, the following results were obtained:

| | Solution A | Solution B |
|---|---|---|
| Wet Pickup (%) | 208 | 160 |
| Solids Add-on (%) | 9.2 | 6.9 |
| Area Shrinkage (%) | | |
| 5 washes | 14.6 | 25.6 |
| 10 washes | 26.6 | 37.6 |

While there have been described various embodiments of the invention, the compositions and methods described are not intended to be understood as limiting the scope of the invention, as changes therewithin are possible and it is intended that each element recited in any of the following claims is to be understood as referring to all equivalent elements for accomplishing substantially the same results in substantially the same or equivalent manner, it being intended to cover the invention broadly in whatever form its principles may be utilized.

What is claimed is:

1. A method for shrinkproofing a proteinaceous material consisting essentially of
   contacting said proteinaceous material with a polymerizable isocyanate-containing treating solution, said isocyanate-containing solution containing the reaction product of a diol and an isocyanate material selected from the group consisting of polyisocyanates and urethane-polyisocyanates, said reaction product containing at least three free isocyanate groups per molecule and less than about 50 mole percent of diol, and
   thereafter curing the thus-treated proteinaceous material with water.

2. The method as claimed in claim 1 wherein the diol is selected from the group consisting of dihydroxy alkanes containing two to 12 carbon atoms, alkylene diols containing two to 12 carbon atoms, polyester diols of molecular weight 200 to 10,000, polyurethane diols of molecular weight of 200 to 10,000, and polyether diols of molecular weight of 62 to 10,000.

3. The method as claimed in claim 2 wherein the isocyanate material contains three isocyanate groups.

4. The method as claimed in claim 3 wherein the diol-isocyanate reaction product is contained in the treating solution in an amount within the range of about 1 to 50 percent by weight of the solution.

5. The method as claimed in claim 4 wherein the isocyanate material is the reaction product of castor oil, and toluene diisocyanate and the diol is polyethylene glycol of molecular weight 1,000.

6. The method as claimed in claim 4 wherein the isocyanate material is toluene diisocyanate and the diol is polyethylene glycol adipate having a molecular weight of 850.

7. The method as claimed in claim 4 wherein the impregnated proteinaceous material is precured in air, in exposure to atmospheric moisture and the final cure is effected by immersing the impregnated material in water at a temperature within the range of about 40° centigrade to about 100° centigrade for a period of from about 1 hour to 1 minute.

8. The method as claimed in claim 4 wherein the isocyanate material is the reaction product of castor oil and toluene diisocyanate and the diol is polyethylene glycol adipate having a molecular weight of 850.

9. A shrinkproof proteinaceous material produced by the method of claim 1.

10. A shrinkproof proteinaceous material produced by the method of claim 2.

11. A shrinkproof proteinaceous material produced by the method of claim 3.

12. A shrinkproof proteinaceous material produced by the method of claim 5.

13. A shrinkproof proteinaceous material produced by the method of claim 6.

14. A shrinkproof proteinaceous material produced by the method of claim 7.

15. A shrinkproof proteinaceous material produced by the method of claim 8.

* * * * *